(12) United States Patent
Domask

(10) Patent No.: US 6,450,220 B2
(45) Date of Patent: Sep. 17, 2002

(54) COPING JIG

(75) Inventor: Dennis P. Domask, Greenleaf, WI (US)

(73) Assignee: Domask Woodcraft Tools, Appleton, WI (US)

( * ) Notice: Subject to any disclaimer, the term of this patent is extended or adjusted under 35 U.S.C. 154(b) by 0 days.

(21) Appl. No.: 09/803,789

(22) Filed: Mar. 12, 2001

Related U.S. Application Data

(60) Provisional application No. 60/188,619, filed on Mar. 13, 2000.

(51) Int. Cl.[7] .............................. B27C 5/10; B27B 5/02; B27M 3/00
(52) U.S. Cl. ...................... 144/144.1; 33/563; 144/137; 144/144.51; 144/371; 144/372; 409/130
(58) Field of Search ................... 33/197, 562, 563, 33/564; 409/125, 130, 182, 92, 124, 85, 93, 97; 144/144.1, 136.7, 136.95, 137, 372, 144.51

(56) References Cited

U.S. PATENT DOCUMENTS

| | | | |
|---|---|---|---|
| 3,999,300 A | 12/1976 | Ban ............................ | 33/174 |
| 4,355,557 A | 10/1982 | Mecsey ....................... | 83/565 |
| 4,356,849 A | 11/1982 | Fredrickson ............. | 144/144.1 |
| 4,871,002 A | 10/1989 | Turner ...................... | 144/144.1 |
| 4,880,042 A | 11/1989 | Schafferkotter ............. | 144/372 |
| 5,040,580 A | 8/1991 | Hufford .................... | 144/144.1 |
| 5,094,279 A | 3/1992 | Dickey et al. ........... | 144/144.1 |
| 5,136,904 A | 8/1992 | Peters ......................... | 83/13 |
| 5,383,503 A | 1/1995 | Johnson .................... | 144/144.5 |
| 5,667,001 A | 9/1997 | Sanger et al. ............ | 144/144.1 |
| 5,778,951 A | 7/1998 | Huitsing .................. | 144/144.1 |
| 5,853,036 A | 12/1998 | Welch ...................... | 144/154.5 |
| 5,893,402 A | 4/1999 | Darling ....................... | 144/372 |
| 6,095,726 A | 8/2000 | Scott et al. .................... | 409/92 |
| 2001/0035231 A1 * | 11/2001 | Domask .................. | 144/144.1 |

FOREIGN PATENT DOCUMENTS

WO  WO 99/36226  7/1999

* cited by examiner

Primary Examiner—W. Donald Bray
(74) Attorney, Agent, or Firm—Andrus, Sceales, Starke & Sawall, LLP

(57) ABSTRACT

A coping jig for guiding a router in cutting the end of a section of decorative trim, preferably for creating an inside corner. The coping jig includes a stationary molding stage that receives a section of molding to be cut. A template platform is mounted above the molding stage by a plurality of resilient mounting members. The resilient mounting members allow the angle of the template platform to change relative to the molding stage. The template platform includes at least one template having a trim pattern formed on an edge surface of the template. The trim pattern is used to guide the router in cutting the molding positioned between the template and the molding stage.

18 Claims, 4 Drawing Sheets

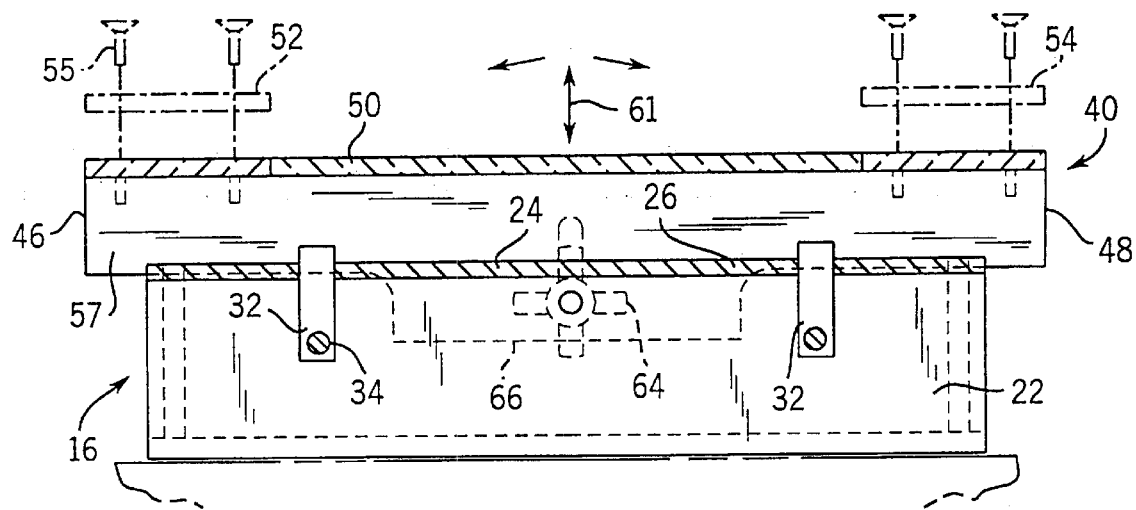
FIG. 3
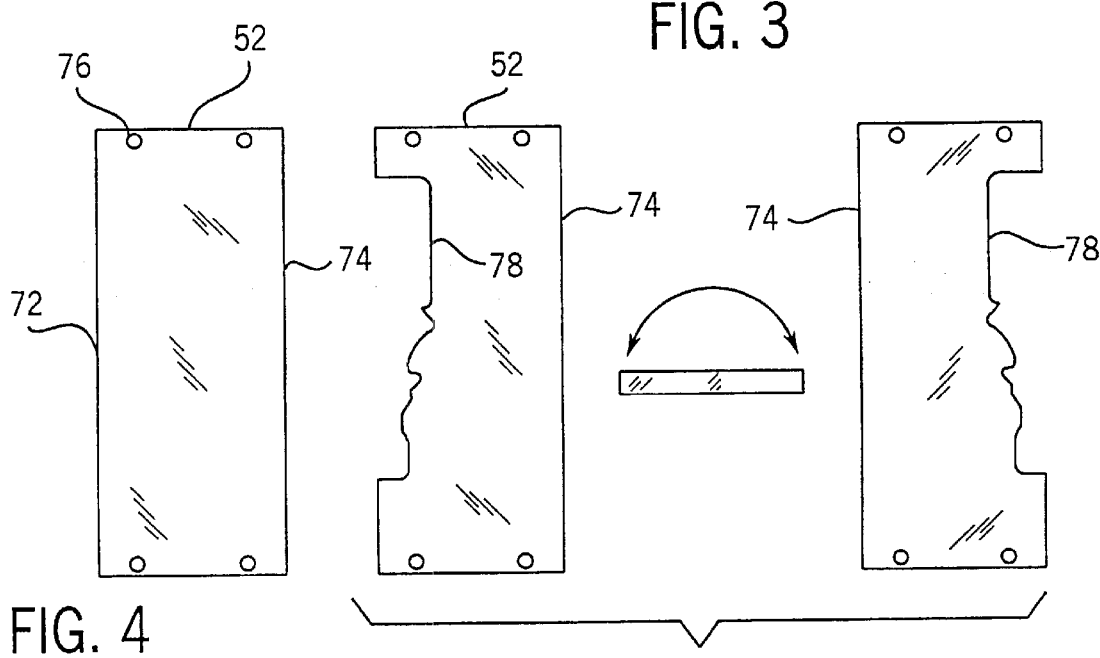
FIG. 4
FIG. 5
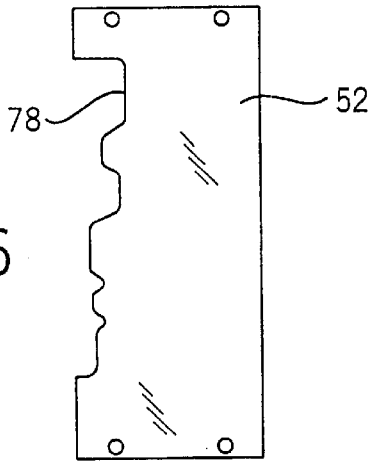
FIG. 6
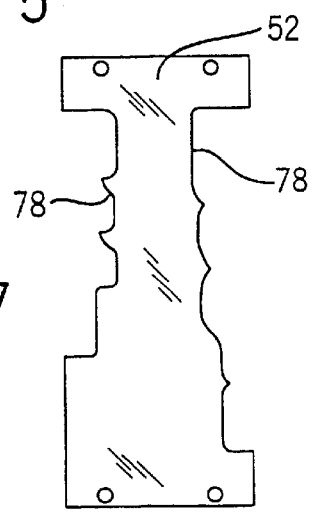
FIG. 7

COPING JIG

CROSS-REFERENCE TO RELATED APPLICATION

This application is based on and claims priority from provisional application Ser. No. 60/188,619 filed on Mar. 13, 2000.

BACKGROUND OF THE INVENTION

The present invention relates to a coping jig for use in woodworking. More specifically, the present invention relates to a coping jig having removable pattern templates that are usable in guiding the cutting path of a router to form a desired end shape for forming an inside corner from decorative molding.

Decorative molding is used in the construction industry as finished trim on a wall adjacent either the floor or ceiling or between the floor and ceiling as a "chair rail". Typically, the decorative molding has an irregular cross-section including a series of ribs and curved recesses which form an aesthetically pleasing design for the molding.

When the molding along a wall meets at an inside corner of a room, a finish carpenter is required to hand carve or use a coping saw to form an end of the molding such that one section of molding mates against the opposing section on the perpendicular wall. Merely cutting the molding at a 45° angle does not form a clean corner due to the irregular cross-section of typical decorative molding. The process of cutting the end of one section of molding requires the carpenter to trace the profile of the molding onto the end of the molding to be cut and repeatedly test the piece against the molding already extending into the corner. In a large house with a substantial amount of molding, or when fitting an intricate molding, this process can significantly increase the amount of time required to fully trim out a house with decorative molding.

The procedure of coping molding is an exacting process, requiring a high degree of care and the skills of an experienced carpenter. Moreover, the process is time-consuming. As each corner requires a piece of molding to have a negative image of the profile of the molding cut into its end and checked for fit and, quite often, modified one or more times, coping creates high demands on the skilled labor resources.

Currently, several coping jigs are available for directing the travel of a router to create the desired profile in a piece of molding, such as shown in the Dickey et al. U.S. Pat. No. 5,094,279, the Sanger et al. U.S. Pat. No. 5,667,001 and the Darling U.S. Pat. No. 5,893,402. Although each of these patents uses some type of pattern to guide the bit of a router in forming the edge surface of a piece of trim, each of these devices is cumbersome and requires generally large pieces of equipment that must be independently supported by a work table or mounted to some type of support surface in order to operate. Further, each of these devices requires a complicated guide plate assembly to guide the router along the desired path of the molding.

Therefore, it is an object of the present invention to provide a coping jig that is easy to operate and self-contained such that it can be used at a work site. Further, it is an object of the present invention to provide a coping jig that angles the plane of the router to create a back cut in the section of molding being cut. Further, it is an object of the present invention to provide a coping jig that allows for easy removal and creation of templates to create the desired cut on the section of molding. Additionally, it is an object of the present invention to provide a coping jig that securely holds a section of molding in place during the cutting process.

SUMMARY OF THE INVENTION

The present invention is a coping jig that is used for guiding a router in making a precision cut along an end of a section of molding such that the molding can be used to form an inside corner.

The coping jig of the present invention includes a stationary base having a pair of sidewalls joined together by a generally flat, horizontal molding stage. The molding stage is positioned to support a section of decorative molding to be end cut by a router. The molding stage includes a stop rail extending along one of its side edges. The stop rail is used to contact and prevent movement of a section of molding to be cut by the router during use of the coping jig.

The base further includes a pair of clamping blocks that extend through the top surface of the molding stage. Each of the clamping blocks is movable toward and away from the stop rail such that the clamping blocks can be adjusted to securely hold a section of molding positioned on the molding stage between the stop rail and the clamping block.

The coping jig further includes a template platform that is mounted above the molding stage. The template platform includes a pair of parallel, spaced side rails that are joined to each other by a top plate. The template platform extends between a first end and a second end. The template platform is constructed to receive a template on either its first end or second end, depending upon the requirements of the type of molding being cut.

The template platform is mounted above the molding stage of the base by a plurality of resilient mounting members. The mounting members create an open space between the molding stage and the template platform for receiving a section of molding to be end cut. The resilient mounting members allow the vertical position of the template platform to change relative to the stationary molding stage. Additionally, the resilient mounting members allow the angular orientation of the template platform relative to the molding stage to change.

A pair of locking members are positioned between the sidewalls of the base and the side rails of the template platform. The locking members are each operable to secure the template platform at a desired angle relative to the stationary base. Preferably, the locking members include a handle that allow the user to tighten the locking members and secure the template platform at its desired angular position.

The template platform includes at least one template having the trim pattern for the decorative molding formed being end cut along one of its edge surfaces. The trim pattern formed on the template allows the router to follow the edge surface of the template while making an identical cut in a section of molding positioned beneath the template. Each of the templates is removable from the template platform and can be reversed and attached to the opposite end of the template platform.

Initially, a pattern section of molding is created by hand or other means and is positioned within the coping jig beneath an uncut, blank template. Once the pattern section of molding is secured within the coping jig, the router is used to follow the end pattern on the pattern section while cutting the identical trim pattern into the blank template positioned above the pattern section of molding. Once the trim pattern has been cut into the template, the pattern section of molding is removed from the jig.

Once the trim pattern has been formed on the template, the coping jig can be used to cut the desired end pattern onto uncut sections of molding. During creation of the end cut on a section of molding, the template platform is positioned at a slight angle relative to the molding stage such that a back cut is formed on the end of the decorative molding.

The templates used to create the end cuts in a section of molding include a pair of edge surfaces that can each include a separate trim pattern. In this manner, a single template can be used to create an end cut on multiple types of decorative molding. Additionally, each of the templates is reversible such that a single template can be used to cut both the right and left end of a section of molding.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3 is a section view taken along line 3—3 of FIG. 2;

FIG. 4 is a top view of one of the blank templates prior to the formation of a trim pattern in one of its edge surfaces;

FIG. 5 is a view illustrating the use of a cut template on either side of the coping jig for cutting either end of a piece of trim;

FIG. 6 is a second embodiment of a template having a trim pattern;

FIG. 7 is a third embodiment of a cut template having different trim patterns formed on each edge thereof;

DETAILED DESCRIPTION OF THE INVENTION

Figure 1:
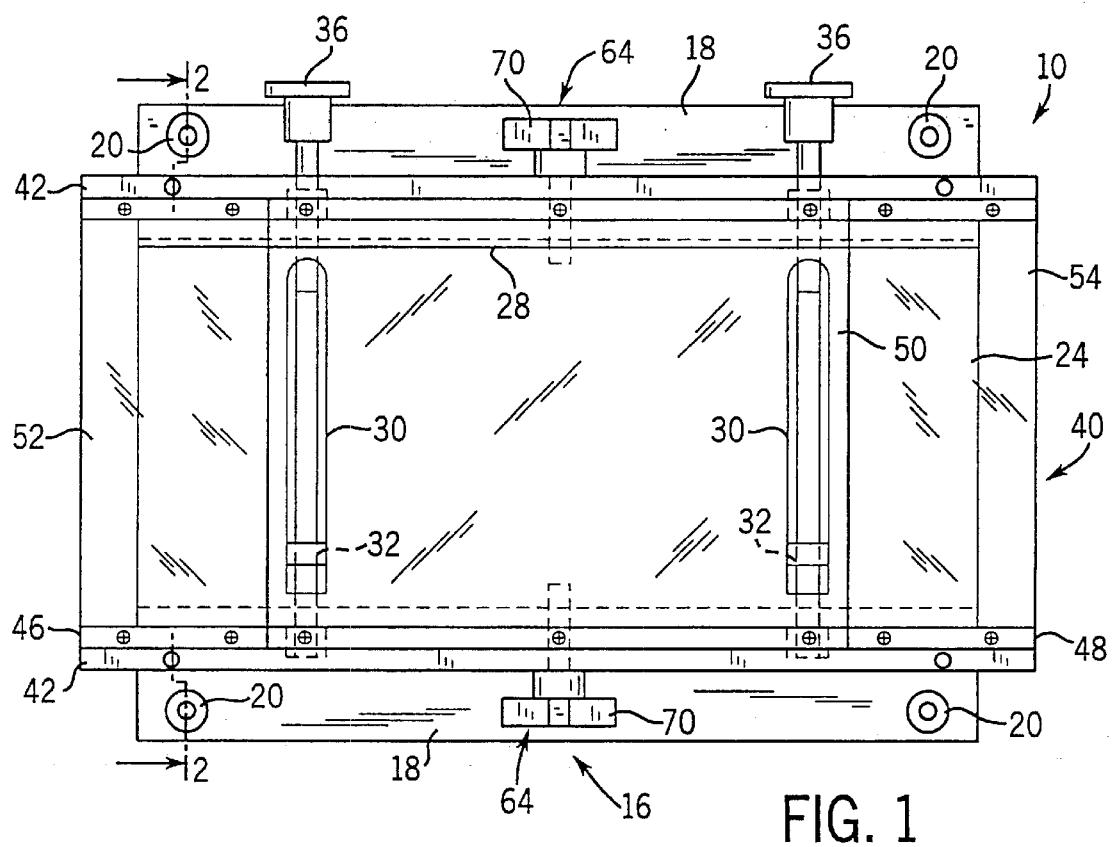
FIG. 1 is a top plan view of the coping jig of the present invention.
Figure 8:
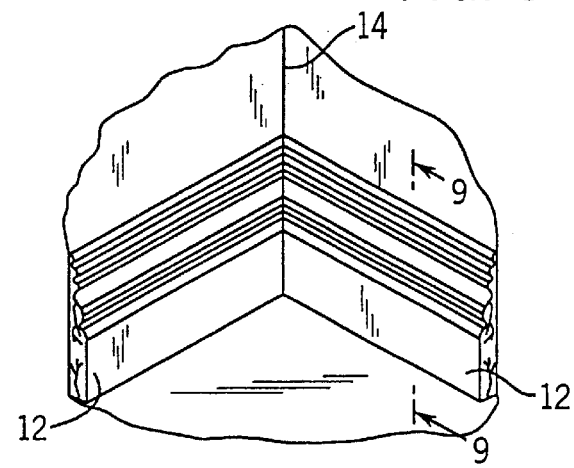
FIG. 8 is a partial perspective view illustrating the positioning of two sections of decorative molding to define an inside corner.

Referring first to FIG. 1, thereshown is the coping jig 10 of the present invention. Coping jig 10 is useful in guiding a router to make an end cut in a section of decorative molding. The coping jig 10 is particularly useful in forming an inside corner between sections of decorative molding 12, as shown in FIG. 8. As illustrated in FIG. 8, one piece of the decorative molding 12 extends into the corner 14, while the perpendicular section of decorative molding 12 includes a negative image of the outer profile of the decorative molding cut into its end. The negative image of the outer profile of the decorative molding allows for a smooth and tight fit between the sections of decorative molding to create a desirable appearance for the inner corner 14, as illustrated in FIG. 8.

Figure 2:
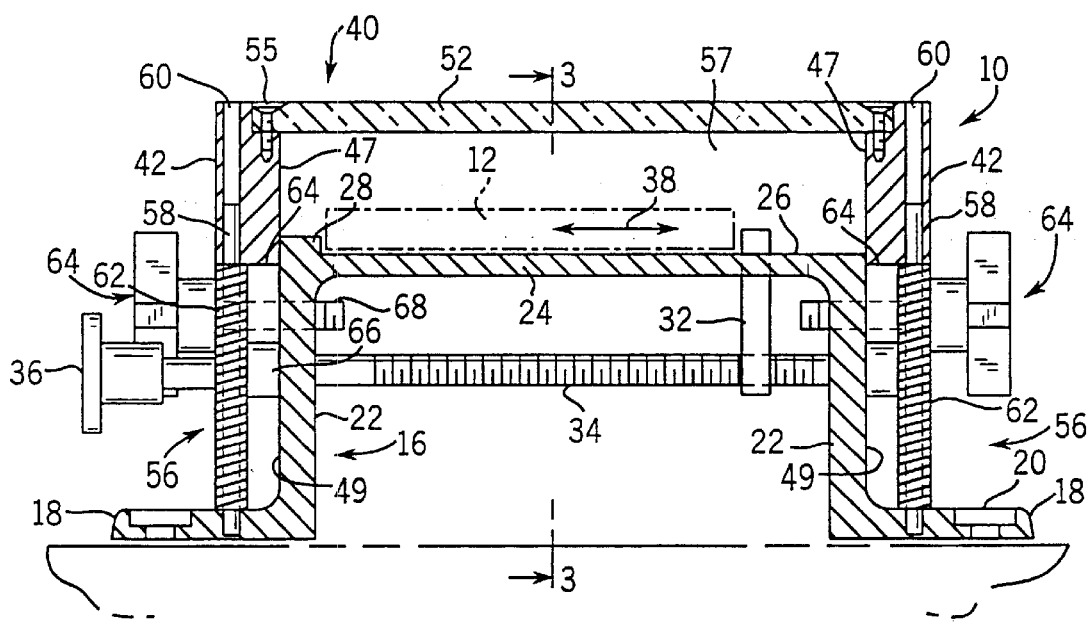
FIG. 2 is a section view taken along line 2—2 of FIG. 1 illustrating the positioning of a piece of trim within the coping jig of the present invention.
Figure 9:
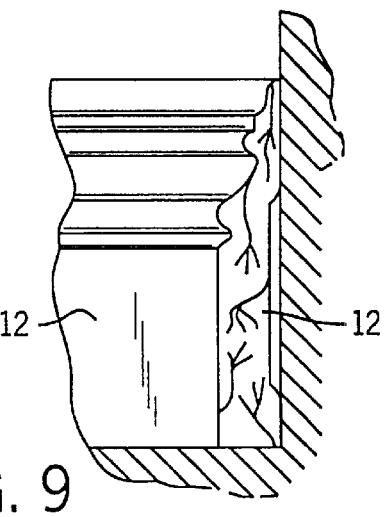
FIG. 9 is a section line taken along line 9—9 of FIG. 8 illustrating the inside corner of FIG. 8.

Referring now to FIGS. 1 and 2, the coping jig 10 of the present invention includes a stationary base 16 having a pair of support flanges 18 that extend along the entire length of the coping jig 10. Each of the support flanges 18 includes a pair of mounting holes 20 that allow the coping jig 10 to be securely mounted to a work surface, if desired. Referring now to FIG. 2, the base 16 includes a pair of spaced, parallel sidewalls 22 that are joined to each other by a generally horizontal molding stage 24. The molding stage 24 and the pair of sidewalls 22 are preferably formed as an integral member from aluminum. The molding stage 24 includes a horizontal flat top surface 26 that is used to support a section of molding, as shown in phantom in FIG. 2.

As illustrated in FIG. 2, the base 16 includes a stop rail 28 that extends along the entire length of the base 16. The stop rail 28 protrudes above the top surface 26 of the molding stage 24. The stop rail 28 is used to contact an edge of the molding when the molding is positioned on the molding stage, as illustrated in phantom in FIG. 2.

Referring now to FIG. 1, the mounting stage 24 includes a pair of open channels 30 that extend across the width of the molding stage 24. The channels 30 extend completely through the molding stage 24 and allow a clamping block 32 to extend through the molding stage 24 and protrude above the top surface 26, as best illustrated in FIGS. 2 and 3.

As shown in FIG. 2, each of the clamping blocks 32 is threadedly received upon an adjustment shaft 34. The adjustment shaft 34 includes a length of external threads that interact with a threaded bore formed in the clamping block 32. Each of the adjustment shafts 34 is rotatably supported between the pair of spaced sidewalls 22 and includes an adjustment knob 36. The adjustment knob 36 extends externally from the base 16 and can be grasped by a user and rotated in either the clockwise or counter-clockwise direction to move the clamping block 32 toward and away from the stop rail 28, as illustrated by arrows 38 in FIG. 2. The use of the adjustment knob 36 and clamping blocks 32 force the edge of the molding 12 into contact with the stop rail 28 such that the section of molding 12 can be securely supported along the top surface 26 of the molding stage 24.

Referring back to FIG. 2, the coping jig 10 further includes a template platform 40 that is positioned above the base 16, as best illustrated in FIG. 2. The template platform 40 includes a pair of side rails 42 that are spaced apart from each other by the width of the molding stage 24. An inner surface 47 of each side rail 42 contacts an outer surface 49 of the sidewall 22 to guide the vertical movement of the template platform 40 relative to the base 16.

The side rails 42 each extend between a first end 46 and a second end 48 of the platform 40, as illustrated in FIG. 1. As can be seen in FIG. 1, the length of the template platform 40 is greater than the length of the base 16, the significance of which will be apparent in the description below.

As can be seen in FIGS. 1 and 3, a top plate 50 is connected between the pair of spaced side rails 42 and 44. The top plate 50 is preferably a section of clear acrylic that is attached between the side rails by plurality of mounting screws.

In addition to the top plate 50, the template platform 40 includes a first template 52 mounted to the first end of the template platform 40 and a second template 54 mounted to the second end 48 of the template platform. In the embodiment of the invention illustrated in FIG. 1, each of the templates 50 and 52 is shown in its uncut condition. Each of the first and second templates 52, 54 is removably attached to each of the side rails 42 by a pair of screw connectors 55, as illustrated in FIG. 3. The ease of removing and replacing the templates 52 and 54 allows the coping jig 10 of the present invention to be configured in various manners, the significance of which will be discussed in detail below.

In the preferred embodiment of the invention, each of the templates 52 and 54 is a clear section of acrylic, which allows the user to view a section of molding when the molding is positioned on the top surface 26 of the molding stage 24.

Referring back to FIG. 2, the template platform 40 is supported above the base 16 by four resilient mounting members 56, one of which is positioned near each of the four corners of the template platform 40. The resilient mounting members 56 creates an open channel 57 defined by the top plate 50, the side rails 42 and the molding stage 24. In the preferred embodiment of the invention, the open channel 57 has a height of 1½" such that the copying jig 10 be used to cut molding up to 1½" thick.

The resilient mounting members 56 allow the template platform 40 to move relative to the stationary base 16, as illustrated by the arrows 61 in FIG. 3. For example, if pressure is placed on the template platform 40 near its first end 46, the first end 46 moves downward such that the angle of the template platform 40 relative to the stationary molding stage 24 changes. Likewise, if pressure is applied near the second end 48, the template platform 40 changes its orientation in the opposite direction relative to the stationary molding stage 24.

Referring back to FIG. 2, each of the resilient mounting members 56 includes a mounting post 58 that is received at one end in the support flange 18 of the base 16. The opposite end of the mounting post 58 is received within an open channel 60 formed in the side rail 42. The mounting post 58 is freely movable within the open channel 60 such that the vertical position of the template platform 40 relative to the molding stage 24 can be changed.

The resilient mounting member 56 further includes a spring 62 that surrounds the mounting post 58 and is entrapped between the lower edge 64 of each side rail 42 and the top surface of each support flange 18. The spring 62 provides the resiliency necessary to permit the template platform 40 to move in the directions illustrated by the arrows 61 in FIG. 3.

Referring now to FIGS. 1 and 2, the coping jig 10 further includes a part of locking members positioned on opposite sides of the coping jig 10. Each of the locking members 64 extends through a locking flange 66 that depends from each of the side rails 42, as illustrated in FIGS. 2 and 3. The locking members 64 each include a threaded shaft 68 that passes through both the locking flange 68 and the sidewall 22 of stationary base 16. The threaded shaft 68 includes a handle 70 that allows the user to tighten and loosen the locking member 64.

When the locking member 64 is sufficiently lose, the template platform 40 can compress the springs 62 and move in the directions illustrated by the arrows 61 in FIG. 3. When the template platform 40 is moved into its desired location, each of the locking members 64 can be tightened to secure the template platform 40 at the desired angle relative to the fixed molding stage 24.

Referring now to FIGS. 4–7, thereshown are individual templates 52 used in connection with the coping jig 10 of the present invention. The blank template 52 of FIG. 4 includes a first edge 72 and a second edge 74. Each template 52 includes a pair of mounting holes 76 on each of its ends. The mounting holes 76 are spaced such that the template 52 can be flipped over and used on both the first end 46 and the second end 48 of the template platform 40, as illustrated in FIG. 5. In FIG. 5, a trim pattern 78 is shown as formed on the template 52 along only the first edge 72. FIG. 5 clearly illustrates the ability of the template 52 to be flipped over and used on either end of the template platform.

FIG. 6 illustrates a second trim pattern 78 formed in the template 52. As can be understood in FIGS. 5 and 6, various types of trim pattern 78 can be formed in the template to correspond to various types of molding.

Referring now to FIG. 7, thereshown is a template having two different trim patterns 78 formed on opposite edge surfaces of the template. FIG. 7 illustrates that the template 52 can include more than one trim pattern, which reduces the number of templates required for various types of trim work.

Referring now to FIGS. 10–15, the use of the coping jig 10 of the present invention will now be described, including the formation of a trim pattern on a blank template and the use of a created template in forming the end of a section of molding.

Figure 10:
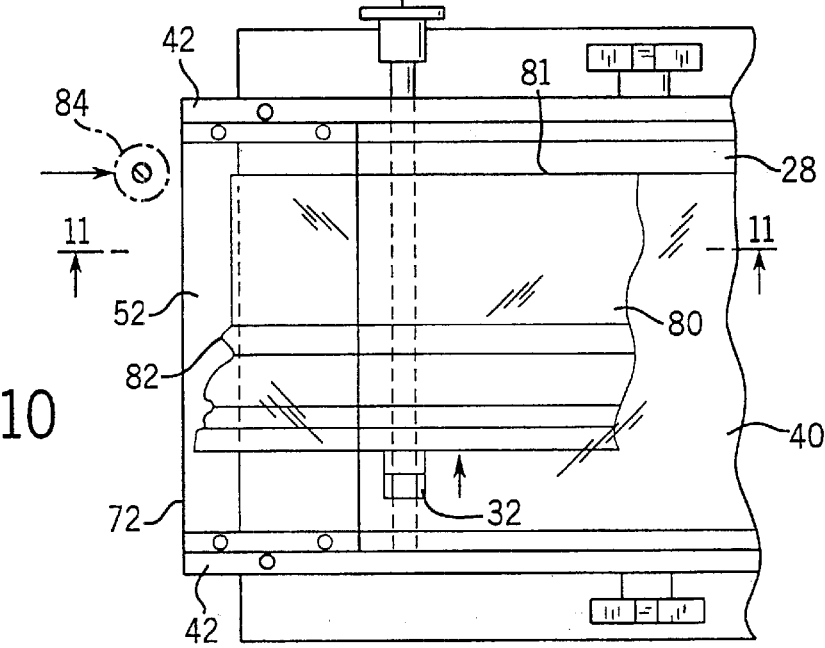
FIG. 10 is a partial top view illustrating the use of a router and a precut pattern section of molding in forming the trim pattern in one of the blank templates.

Initially, a trim carpenter manually forms the desired end profile on a section of decorative molding such that the finished end creates the desired appearance in the inside corner. Once this pattern section 80 of molding has been formed with the desired end pattern 82, the pattern section of molding 80 is positioned on the top surface of the molding stage, as illustrated in FIG. 10. The pattern section 80 is positioned such that the bottom surface 81 of the molding is placed in contact with the stop rail 28. Once in position, the adjustment knob 36 is rotated, which causes the clamping block 32 to press the molding securely between the clamping block 32 and the stop rail 28.

Figure 11:
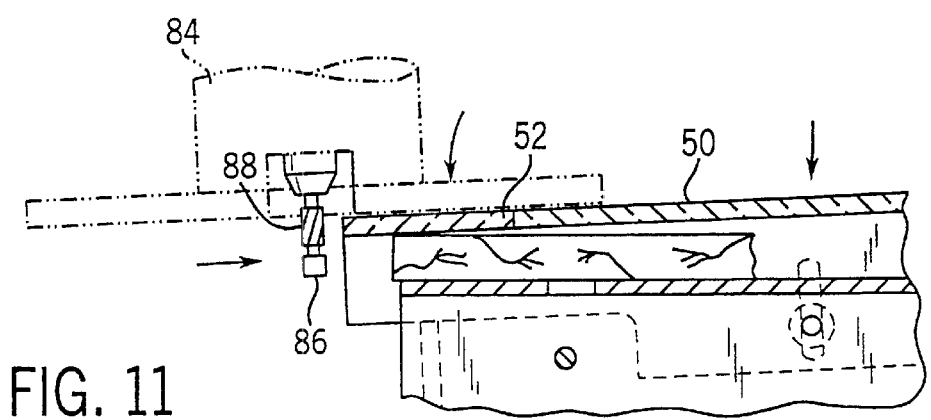
FIG. 11 is a section view taken along line 11—11 of FIG. 10.

After the pattern section 80 of molding is securely positioned on the molding stage 24, a blank template is secured to the template platform 40 between the side rails 42. As illustrated in FIG. 10, the first edge 72 of the blank template 52 defines a straight edge that extends past the end pattern 82 of the pattern section of molding 80. Once in position, a router 84 placed in contact with the top plate 50 and template 52, as shown in FIG. 11. As illustrated in FIG. 11, the router 84 includes a bit having a follower 86 positioned beneath the cutting blade 88.

Figure 13:
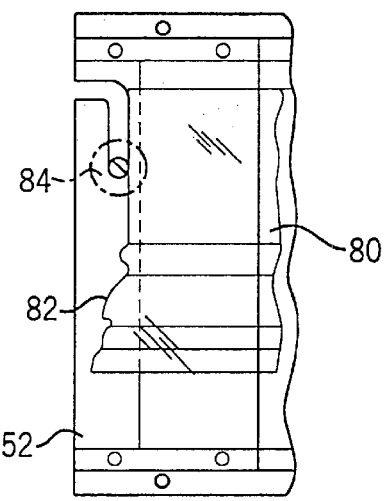
FIG. 13 is a top view similar to FIG. 12 illustrating the use of the router to form the trim pattern in the blank template.
Figure 12:
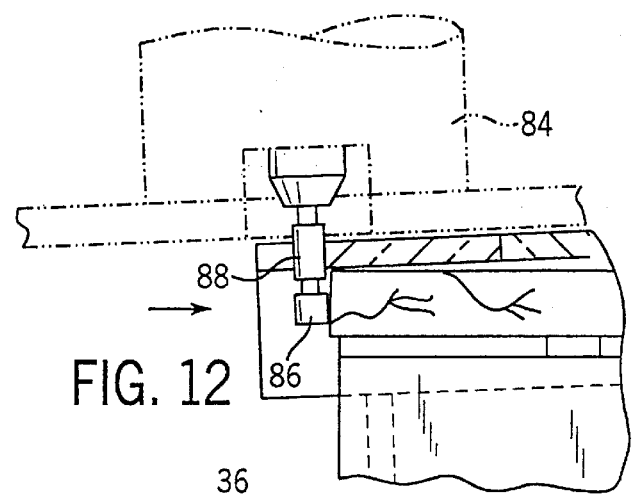
FIG. 12 is a sectional side view similar to FIG. 11 illustrating the use of a router to form the trim pattern on one of the blank templates.

As illustrated in FIGS. 12 and 13, the router 84 is operated such that the follower 86 contacts the end pattern 82 of the pattern section of molding 80 such that the router 84 can accurately follow the end pattern 82 while cutting the exact shape in the blank template 52. Since the follower 86 and cutting blade 88 of the router are configured as shown in FIG. 12, the router 84 only cuts the template 52, such that a trim pattern is formed along the edge surface of the template 52. Once the router 84 has finished creating the trim pattern in the template 52, the template 52 is ready to be used to cut an end of a section of molding.

Figure 14:
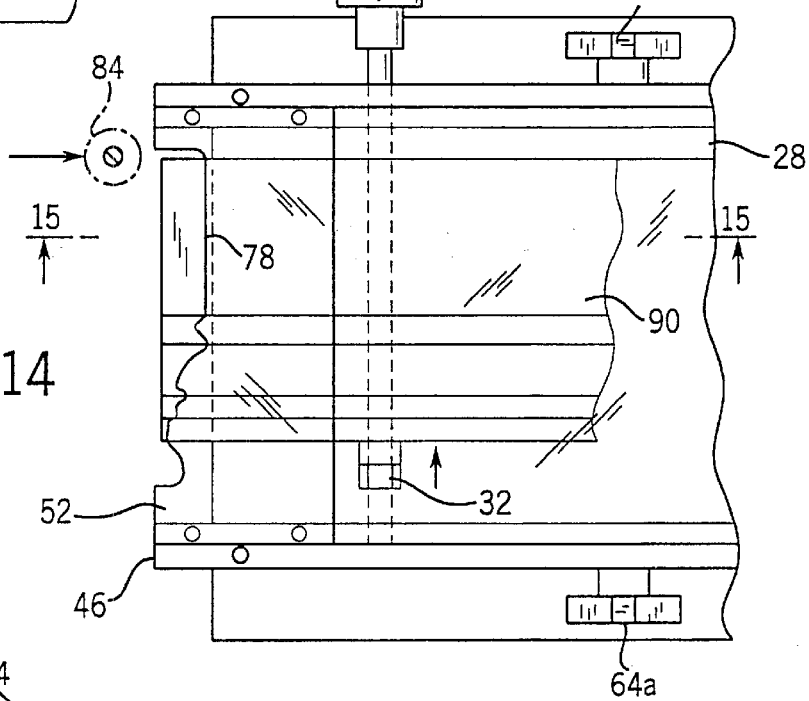
FIG. 14 is a top view illustrating the use of the router and template to end cut the required profile on a section of molding.

Referring now to FIG. 14, the template 52 having the trim pattern 78 formed along its edge surface can be used in cutting an uncut section of molding 90. Initially, the uncut section of molding 90 is positioned on the molding stage and clamped in place by rotation of the adjustment knob 36, which causes the clamping block 32 to press the molding 90 into contact with the stop rail 28.

Figure 15:
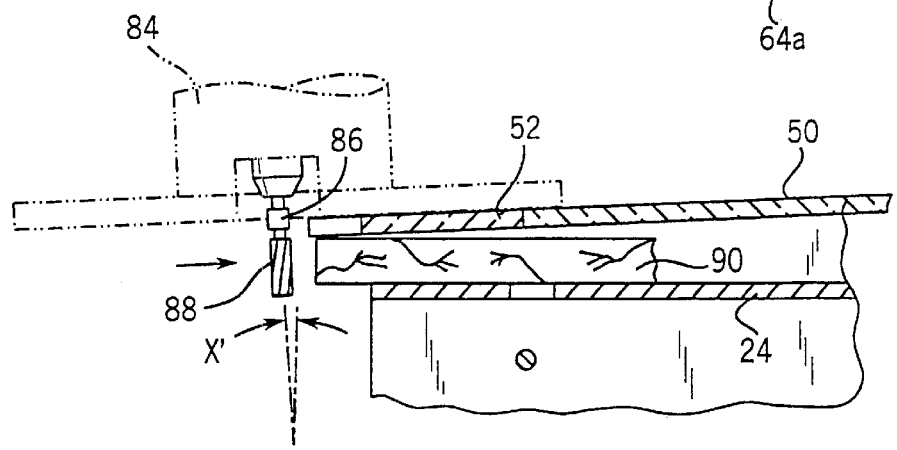
FIG. 15 is a section view taken along line 15—15 of FIG. 14 illustrating the use of the router bit to form the desired profile on the end of a section of decorative molding.

Once the section of molding 90 is securely held in place, the user depresses the first end 46 of the template platform such that the template 52 contacts the molding 90, as illustrated in FIG. 15. As previously discussed, the height of the open channel 57 is approximately 1½" while the thickness of the molding 90 is ¾. The difference in the thickness of the molding and the height of the open channel 57 allows the entire template platform 40, including the top plate 50 and the template 52, to be positioned at an angle relative to the stationary and horizontal mounting stage 24. With pressure continuously applied to the template platform 40, the user locks the template platform in its angled position by tightening the pair of locking members 64. Once the locking members are securely tightened, the router 84 can be used to cut the end of the unfinished section of trim 90.

As illustrated in FIG. 15, the router 84 includes a second bit in which the follower 86 is positioned above the cutting blade 88. In this manner, the router bit follows the trim pattern 78 formed on the template 52 while cutting the identical pattern into the end of the molding 90.

Since the template 52 is positioned at an angle relative to the molding stage 24 and the molding 90, the router bit creates an end pattern having a back cut angle, as illustrated by X' in FIG. 15. The back cut angle X' allows the front face of the molding to extend slightly further than the back face to create a more pleasing appearance to an inside corner.

In the embodiment of the invention shown in FIG. 14, the template 52 is shown in position for cutting the left end of the molding 90. However, if it was desired to cut the right end of the molding, the template 52 could be flipped over and attached near the second end 48 of the template platform 40, as illustrated in FIG. 1. In this manner, the single template can be used to cut either end of a section of molding by simply removing the template, flipping it over, and reattaching it to the opposite end of the template platform.

As can be understood by the above disclosure, various templates can be formed for different types of trim profiles. When a different trim profile is to be cut, the template is removed and the correct template installed on the correct end of the template platform. In this manner, a simple changeover can be performed to allow for different sections of trim to be cut.

Various alternatives and embodiments are contemplated as being within the scope of the following claims particularly pointing out and distinctly claiming the subject matter regarded as the invention.

I claim:

1. A coping jig for guiding a router for making joints in a section of molding, the coping jig comprising:
   a molding stage having a generally flat top surface for supporting the molding, the molding stage including a stop rail extending above the top surface along one side of the molding stage, wherein the stop rail is positioned for contacting and accurately positioning the molding along the molding stage;
   at least one clamping block for securing the molding in a fixed position on the molding stage, wherein the clamping block is movable along the molding stage toward and away from the stop rail to clamp the molding between the stop rail and the clamping block;
   a template platform extending between a first end and a second end, the template platform having a pair of spaced side rails extending between the first and second ends and a top plate attached between the side rails, the template platform being mounted above the molding stage such that the molding is positionable on the molding stage between the side rails and beneath the top plate; and
   a template mounted between the side rails of the template platform at the first end of the template platform, the template including a trim pattern formed on an edge surface of the template for guiding the router in cutting the molding positioned beneath the template on the molding stage.

2. The coping jig of claim 1 wherein the template includes a second edge surface, wherein the first edge surface includes a first trim pattern and the second edge surface includes a second trim pattern.

3. The coping jig of claim 1 wherein the template is removably mounted to both the first end of the template platform and the second end of the template platform.

4. The coping jig of claim 3 wherein the template is reversed when the template is moved from the first end of the template platform to the second end of the template platform.

5. The coping jig of claim 1 further comprising a second clamping block spaced from the first clamping block and independently adjustable from the first clamping block to clamp the molding between the stop rail and the second clamping block.

6. A coping jig for guiding a router for making joints in a section of molding, the coping jig comprising:
   a molding stage having a generally flat top surface for supporting the molding;
   at least one clamping block for securing the molding in a fixed position on the molding stage;
   a template platform extending between a first end and a second end, the template platform having a pair of parallel spaced side rails extending between the first and second ends, the template platform being mounted above the mounting stage by a plurality of resilient mounting members, wherein the angle of the template platform relative to the molding stage can be varied by the resilient mounting members;
   at least one locking member positioned between the molding stage and the template platform, the locking member being operable to securely hold the template platform at a selected angle relative to the molding stage; and
   a template removably mounted between the side rails of the template platform, the template including a trim pattern formed on an edge surface of the template for guiding the router in cutting the molding positioned beneath the template on the molding stage.

7. The coping jig of claim 6 wherein the resilient mounting members each include a mounting post and a spring, wherein the spring contacts the side rail to resiliently mount the side rail relative to the molding stage.

8. The coping jig of claim 6 wherein each side rail of the template platform is supported by a pair of resilient mounting members, wherein one of the resilient mounting members is positioned near the first end of the template platform and another resilient mounting member is positioned near the second end of the template platform.

9. The coping jig of claim 6 wherein the template includes a first edge surface and a second edge surface, wherein the first edge surface includes a first trim pattern and the second edge surface includes a second trim pattern.

10. The coping jig of claim 6 wherein the first template is removably mounted to both the first end of the template platform and the second end of the template platform.

11. The coping jig of claim 6 wherein the molding stage includes a stop rail extending above the top surface along one side of the molding stage, the stop rail being positioned for contacting and accurately positioning the molding on the molding stage.

12. The coping jig of claim 11 wherein the clamping block is movable along the molding stage toward and away from the stop rail to clamp the molding between the stop rail and the clamping block.

13. The coping jig of claim 6 further comprising a second locking member positioned between the molding stage and the template platform on the opposite side of the template platform, the second locking member being independently operable to securely hold the template platform at a selected angle relative to the molding stage.

14. A method of making a joint in a section of molding, the method comprising the steps of:

creating a pattern section of molding having a desired end pattern;

positioning the pattern section of molding on a molding stage;

positioning an uncut template above the pattern section of trim, the uncut template being supported by a template platform resiliently mounted relative to the molding stage;

operating a router to follow the desired end pattern on the pattern section of molding while cutting the template to form a trim pattern on an edge of the template;

removing the pattern section of molding from the molding stage;

positioning an uncut section of molding on the molding stage beneath the template;

adjusting the angle of the template relative to the molding stage through use of the resilient mounting members; and operating the router to follow the trim pattern formed on the template such that the route cuts the uncut section of molding positioned therebelow.

15. The method of claim 14 further comprising the step of removing the template from the template platform and attaching the template to an opposite end of the template platform.

16. The method of claim 14 further comprising the step of operating a locking member to secure the template platform relative to the molding stage at the desired angle.

17. The method of claim 14 wherein the step of adjusting the angle of the template platform relative to the molding stage includes depressing one end of the template platform such that the resilient mounting members supporting that end of the template platform are compressed.

18. The method of claim 14 further comprising the step of securing the uncut section of molding on the molding stage by moving a clamping block into contact with the uncut section of molding such that the uncut section of molding is entrapped between the mounting block and a stop rail extending above the molding stage.

* * * * *